United States Patent
Welton et al.

(10) Patent No.: US 7,303,019 B2
(45) Date of Patent: *Dec. 4, 2007

(54) VISCOELASTIC SURFACTANT FLUIDS AND ASSOCIATED DIVERTING METHODS

(75) Inventors: Thomas D. Welton, Duncan, OK (US); Samuel J. Lewis, Duncan, OK (US); Gary P. Funkhouser, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 214 days.

This patent is subject to a terminal disclaimer.

(21) Appl. No.: 11/058,612

(22) Filed: Feb. 15, 2005

(65) Prior Publication Data

US 2006/0180309 A1  Aug. 17, 2006

(51) Int. Cl.
E21B 43/28  (2006.01)

(52) U.S. Cl. .................. 166/307; 166/282; 507/259

(58) Field of Classification Search .............. None
See application file for complete search history.

(56) References Cited

U.S. PATENT DOCUMENTS

| | | | |
|---|---|---|---|
| 4,061,580 A | 12/1977 | Jahnke | 252/8.55 R |
| 4,215,001 A | 7/1980 | Elphingstone et al. | 252/8.55 C |
| 4,324,669 A | 4/1982 | Norman et al. | 252/8.55 C |
| 4,495,389 A | 1/1985 | Place | 200/83 P |
| 4,591,447 A | 5/1986 | Kubala | 252/8.55 C |
| 4,737,296 A | 4/1988 | Watkins | 252/8.553 |
| 5,009,799 A | 4/1991 | Syrinek et al. | 252/8.553 |
| 5,551,516 A | 9/1996 | Norman et al. | 166/308 |
| 5,964,295 A | 10/1999 | Brown et al. | 166/308 |
| 6,258,859 B1 | 7/2001 | Dahayanake et al. | 516/77 |
| 6,399,546 B1 | 6/2002 | Chang et al. | 507/240 |
| 6,482,866 B1 | 11/2002 | Dahayanake et al. | 516/77 |
| 6,491,099 B1 | 12/2002 | Di Lullo Arias et al. | 166/300 |
| 6,667,280 B2 | 12/2003 | Chang et al. | 507/240 |
| 6,703,352 B2 | 3/2004 | Dahayanake et al. | 507/241 |
| 6,929,070 B2 * | 8/2005 | Fu et al. | 166/308.2 |
| 2002/0002205 A1 | 1/2002 | Dahayanake et al. | 516/77 |
| 2003/0019627 A1 | 1/2003 | Qu et al. | 166/281 |
| 2003/0054962 A1 | 3/2003 | England et al. | 507/117 |

(Continued)

FOREIGN PATENT DOCUMENTS

| | | |
|---|---|---|
| GB | 2 389 603 A | 8/2002 |
| GB | 2 389 604 A | 8/2002 |

*Primary Examiner*—Jennifer H. Gay
*Assistant Examiner*—Kerry W. Leonard
(74) *Attorney, Agent, or Firm*—Robert A. Kent; Baker Botts L.L.P.

(57) ABSTRACT

Provided are treatment fluids that comprise an aqueous base fluid, and a methyl ester sulfonate surfactant, and associated diverting methods of use. In one embodiment, the present invention provides a method of treating a subterranean formation comprising: providing a treatment fluid comprising an aqueous base fluid, and a methyl ester sulfonate surfactant; introducing the treatment fluid into a portion of a subterranean formation; and allowing the treatment fluid to divert at least a portion of a second fluid to a different portion of the subterranean formation. Also provided are methods of diverting a fluid from a portion of a subterranean formation. In some instances, the treatment fluids exhibit viscoelastic behavior which may be due, at least in part, to the association of at least a portion of the methyl ester sulfonate surfactant into a plurality of micellar structures.

20 Claims, 3 Drawing Sheets

U.S. PATENT DOCUMENTS

| | | | |
|---|---|---|---|
| 2003/0139298 A1 | 7/2003 | Fu et al. | 507/200 |
| 2003/0166461 A1 | 9/2003 | Angeletakis et al. | 502/159 |
| 2003/0236179 A1 | 12/2003 | Bodet et al. | 510/475 |
| 2004/0009880 A1 | 1/2004 | Fu | 507/200 |
| 2004/0023812 A1 | 2/2004 | England et al. | 507/100 |
| 2004/0045710 A1 | 3/2004 | Fu et al. | 166/282 |

* cited by examiner

VISCOELASTIC SURFACTANT FLUIDS AND ASSOCIATED DIVERTING METHODS

CROSS-REFERENCE TO RELATED APPLICATIONS

The present invention is related to co-pending U.S. application Ser. No. 11/058,660 entitled "Viscoelastic Surfactant Fluids and Associated Methods," filed concurrently herewith, U.S. application Ser. No. 11/058,475, now U.S. Pat. No. 7,159,659 entitled "Viscoelastic Surfactant Fluids and Associated Acidizing Methods," filed concurrently herewith, and co-pending U.S. application Ser. No. 11/056,611 entitled "Viscoelastic Surfactant Fluids and Associated Methods," filed concurrently herewith, the entire disclosures of which are incorporated herein by reference.

BACKGROUND

The present invention relates to methods and compositions for treating subterranean formations. More particularly, the present invention relates to treatment fluids that comprise a methyl ester sulfonate ("MES") surfactant, and associated diverting methods.

Viscosified treatment fluids may be used in a variety of subterranean treatments. Such treatments include, but are not limited to, drilling operations, stimulation treatments, and sand control treatments. As used herein, the term "treatment," or "treating," refers to any subterranean operation that uses a fluid in conjunction with a desired function and/or for a desired purpose. The term "treatment," or "treating," does not imply any particular action by the fluid.

The diversion of treatment fluids in subterranean operations is well known and may be desirable in a variety of subterranean operations, such as in acid stimulation operations, injection operations, scale inhibition operations, and clay stabilization operations. In many instances, diversion is desirable because the treatment fluid may preferentially enter portions of a subterranean formation with high permeability at the expense of portions of the subterranean formation with lesser permeability. For example, in acid stimulation operations, it may be desired to contact less permeable portions of the subterranean formation with the treatment fluid containing an acid so as to achieve the desired stimulation. In other instances, it might be desired to divert a treatment fluid away from certain portions (e.g., water-producing portions) of a subterranean formation entirely so as to treat other portions (e.g., hydrocarbon-producing portions) of the subterranean formation. In scale inhibition operations and clay stabilization operations, it may be desirable to divert the treatment fluid so as to obtain a uniform distribution of the treatment fluid throughout the subterranean formation regardless of the permeability of the particular portion thereof.

A variety of techniques have been used to divert treatment fluids to less permeable portions of a subterranean formation. Such techniques have involved, among other things, the injection of particulates, foams, or blocking polymers (e.g., crosslinked aqueous gels) into the subterranean formation so as to plug off the high-permeability portions of the subterranean formation, thereby diverting subsequently injected fluids to less permeable portions of the subterranean formation. In certain techniques, a treatment fluid is placed adjacent to a high-permeability portion of a subterranean formation, and the treatment fluid is viscosified so as to form a gel that, inter alia, temporarily plugs the perforations or natural fractures in that portion of the formation. When another treatment fluid encounters the gel, it is diverted to other portions of the formation. While these diversion techniques have been used successfully, each technique also has disadvantages. First, in some instances, plugging off the high-permeability sections may not be suitable for a producing formation, for example, because the injected solution (or material) may reduce or stop the flow of hydrocarbons in addition to the achieving a desired diversion of the treatment fluid. Expensive and/or time-consuming remedial treatments may be required to remove the injected solution (or material) and/or to return the formation to production. Furthermore, techniques geared toward injecting solutions (or materials) designed to plug off high-permeability portions of the subterranean formation may require expensive zonal isolation, which may be inaccurate or lead to inadvertent plugging of and/or damage to the hydrocarbon-bearing sections. Moreover, polymeric gelling agents may leave an undesirable residue in the subterranean formation after use. As a result, potentially costly remedial operations may be required to cleanup the fracture face and proppant pack.

To combat these problems, some surfactants have been used as gelling agents in diverting treatments. Certain surfactants, when mixed with an aqueous fluid having a certain ionic strength, are capable of forming a viscous fluid that has certain elastic properties, one of which may be shear thinning. Surfactant molecules (or ions) at specific conditions may form micelles (e.g., worm-shaped micelles, rod-shaped micelles, etc.) in an aqueous fluid. Depending on, among other things, the surfactant concentration, and the ionic strength of the fluid, etc., these micelles may impart increased viscosity to the aqueous fluid, such that the fluid exhibits viscoelastic behavior due, at least in part, to the association of the surfactant molecules contained therein. The viscoelastic fluid then may plug off a high-permeability section of the subterranean formation and divert treatment fluids subsequently introduced into the subterranean formation to less permeable sections of the formation. Further, because the micelles may be sensitive to the pH and hydrocarbons, the viscosity of the viscoelastic fluid may be reduced after introduction into the subterranean formation without the need for conventional gel breakers (e.g., oxidizers). This may allow a substantial portion of that fluid to be produced back from the formation without the need for expensive remedial treatments. However, surfactants used heretofore as gelling agents tend to have undesirable environmental characteristics (e.g., toxicity) and/or may be limited by strict environmental regulations in certain areas of the world.

SUMMARY

The present invention relates to methods and compositions for treating subterranean formations. More particularly, the present invention relates to treatment fluids that comprise a MES surfactant, and associated diverting methods.

An embodiment of the present invention provides a method of treating a subterranean formation, the method comprising: providing a treatment fluid comprising an aqueous base fluid, and a MES surfactant; introducing the treatment fluid into a portion of a subterranean formation; and allowing the treatment fluid to divert at least a portion of a second fluid to a different portion of the subterranean formation.

Another embodiment of the present invention provides a method of treating a subterranean formation, the method comprising: providing a treatment fluid comprising an aqueous base fluid, a water-soluble salt, and a MES surfactant; introducing the treatment fluid into a portion of the subterranean formation; introducing a second fluid into a well bore that penetrates the subterranean formation; allowing the treatment fluid to form a gel sufficient to divert at least a portion of the second fluid to a different portion of the subterranean formation.

Another embodiment of the present invention provides a method of diverting a fluid from a portion of a subterranean formation, the method comprising: providing a treatment fluid comprising an aqueous base fluid, a water-soluble salt, and a MES surfactant; introducing the treatment fluid into the portion of the subterranean formation; introducing a second fluid into a well bore that penetrates the subterranean formation; and allowing the treatment fluid to divert at least a portion of the second fluid to a different portion of the subterranean formation.

The features and advantages of the present invention will be readily apparent to those skilled in the art upon a reading of the description of the preferred embodiments that follows.

DRAWINGS

A more complete understanding of the present disclosure and advantages thereof may be acquired by referring to the following description taken in conjunction with the accompanying drawings, wherein.

Figure 1:
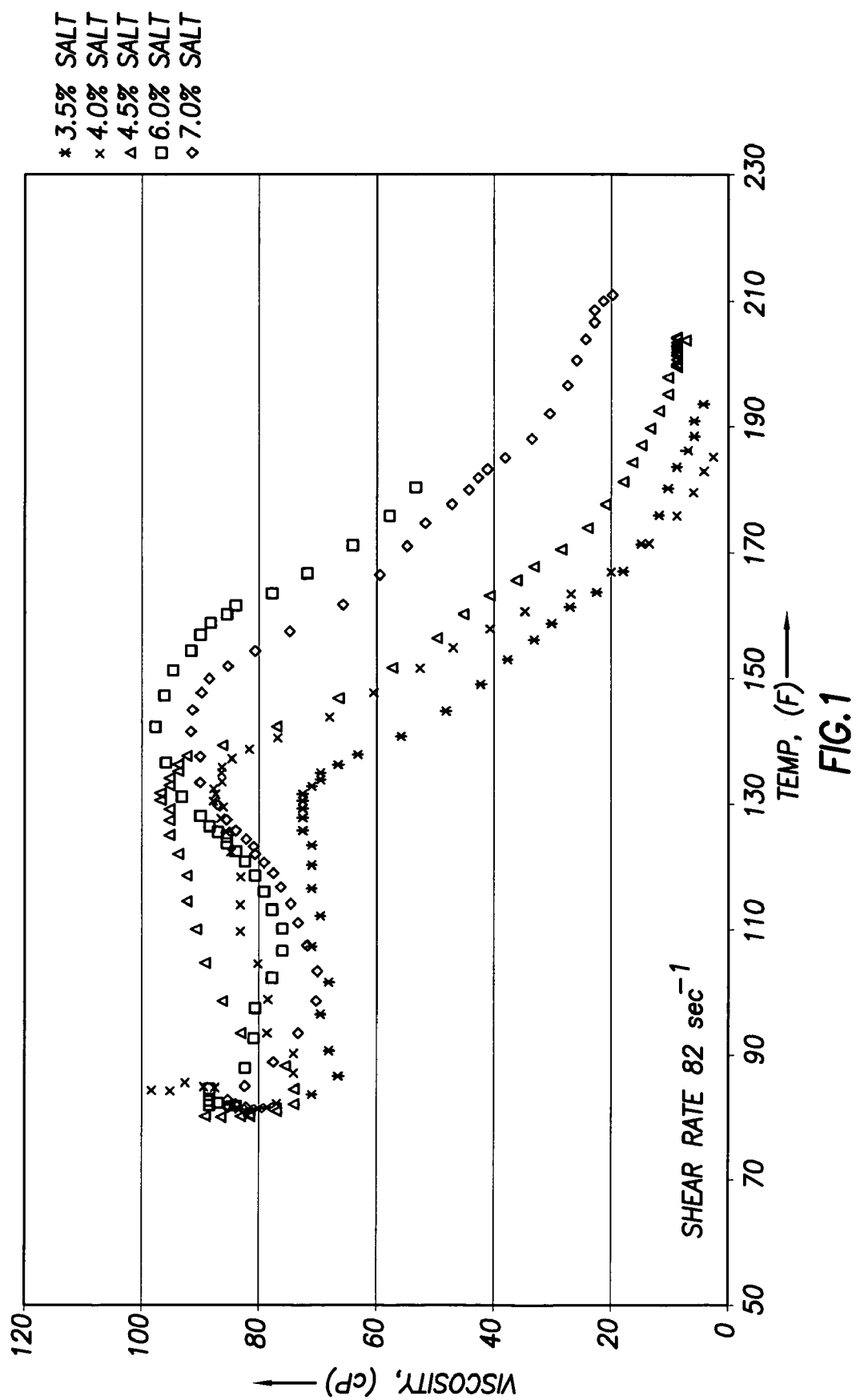
FIG. 1 is a plot of temperature versus viscosity as measured using a nonscanning shear rate procedure on a Fann Model 50 viscometer for sample fluids that comprises a MES surfactant and concentrations of sodium chloride.

While the present invention is susceptible to various modifications and alternative forms, specific exemplary embodiments thereof have been shown by way of example in the drawings and are herein described in detail. It should be understood, however, that the description herein of specific embodiments is not intended to limit or define the invention to the particular forms disclosed, but on the contrary, the intention is to cover all modifications, equivalents, and alternatives falling within the spirit and scope of the invention as defined by the appended claims. The figures should in no way be used to limit the meaning of the claim terms.

DESCRIPTION OF PREFERRED EMBODIMENTS

The present invention relates to methods and compositions for treating subterranean formations. More particularly, the present invention relates to treatment fluids that comprise a MES surfactant, and associated diverting methods.

The treatment fluids of the present invention generally comprise a MES surfactant, an aqueous base fluid, and a water-soluble salt. In some instances, the treatment fluids of the present invention may exhibit viscoelastic behavior which may be due, at least in part, to the association of at least a portion of the MES surfactant into a plurality of micellar structures. Additionally, other additives suitable for use in the particular application may be included in the treatment fluids of the present invention as recognized by one of ordinary skill in the art having the benefit of this disclosure.

The MES surfactants suitable for use in the present invention are described by the following formula:

Formula I where R is an alkyl chain of from about 10 carbon atoms to about 30 carbon atoms. In some embodiments, R is an alkyl chain of from about 16 carbon atoms to about 22 carbon atoms. An example of a suitable MES surfactant of Formula I is a palm-oil derivative commercially available from Halliburton Energy Services, Inc., Duncan, Okla., under the trade name EFS™-4 surfactant. MES surfactants are believed to be relatively environmentally benign, in most instances, because these surfactants are biodegradable in most environments. The MES surfactants of Formula I are a class of anionic surfactants that have been found to cause fluids to exhibit viscoelastic properties. It is believed that, when the MES surfactant is dissolved in an aqueous environment having a certain ionic strength, the MES surfactant molecules (or ions) may associate to form micelles because of their hydrophobic and hydrophilic regions. These micelles may be rod-shaped, worm-shaped, or any of a variety of other shapes that will viscosify a fluid where present in sufficient concentrations. In certain embodiments, a sufficiently high concentration of ions to facilitate micelle formation may be maintained, inter alia, by the addition of a water-soluble salt or the interaction of the fluid and/or certain components contained therein with other materials resident in the subterranean formation that generate ions in the presence of the fluid and/or its components. These micelles may function, among other things, to increase the viscosity of the fluid therein. In the presence of a sufficient amount of hydrocarbons or at a certain ionic strength, these micelles may become unstable, thereby disassociating or forming a micellar structure that is not conducive to viscosifying a fluid. This disassociation and/or modification of the micellar structure leads to a reduction in viscosity for the treatment fluid.

The MES surfactant should be present in an embodiment of a treatment fluid of the present invention in an amount sufficient to provide the desired viscosity (e.g., sufficient viscosity to divert flow, reduce fluid loss, etc.) therein through formation of the desired micelles. In certain embodiments, the MES surfactant may be present in the fluids in an amount of from about 0.5% to about 15% by weight of the treatment fluid ("bwof"). In certain exemplary embodiments, the MES surfactant may be present in the treatment fluids of the present invention in an amount of from about 0.5% to about 5% bwof. One of ordinary skill in the art, with the benefit of this disclosure, will be able to determine the appropriate amount of the MES surfactant to include in a treatment fluid of the present invention based on a number of factors, including the amount and type of the one or more salts used, the desired viscosity, the ionic strength of the fluid, and/or the amount and type of co-surfactant employed.

The aqueous base fluid used in the treatment fluids of the present invention may comprise fresh water, saltwater (e.g., water containing one or more salts dissolved therein), brine (e.g., saturated saltwater), seawater, or combinations thereof. Generally, the water may be from any source, provided that it does not contain components that might adversely affect the stability of the treatment fluids of the present invention.

To provide the ionic strength for the desired micelle formation, the treatment fluids of the present invention may comprise a water-soluble salt. Adding a salt may promote micelle formation for the viscosification of the fluid. In some embodiments, the aqueous base fluid may contain the water-soluble salt, for example, where saltwater, a brine, or seawater is used as the aqueous base fluid. Suitable water-soluble salts may comprise lithium, ammonium, sodium, potassium, cesium, magnesium, calcium, or zinc cations, and chloride, bromide, iodide, formate, nitrate, acetate, cyanate, or thiocynate anions. Examples of suitable water-soluble salts that comprise the above-listed anions and cations include, but are not limited to, ammonium chloride, lithium bromide, lithium chloride, lithium formate, lithium nitrate, calcium bromide, calcium chloride, calcium nitrate, calcium formate, sodium bromide, sodium chloride, sodium formate, sodium nitrate, potassium chloride, potassium bromide, potassium nitrate, potassium formate, cesium nitrate, cesium formate, cesium chloride, cesium bromide, magnesium chloride, magnesium bromide, zinc chloride, and zinc bromide. In certain embodiments, the water-soluble salt may be present in the treatment fluids of the present invention in an amount in the range of from about 1% to about 10% bwof. In certain other embodiments, the water-soluble salt may be present in the treatment fluids of the present invention in an amount in the range of from about 5% to about 10% bwof.

The treatment fluids may optionally comprise a co-surfactant, among other things, to facilitate the formation of and/or stabilize a foam, increase salt tolerability, and/or stabilize the treatment fluid. The co-surfactant may comprise any surfactant suitable for use in subterranean environments that does not adversely affect the treatment fluid. Examples of suitable co-surfactants include betaines (e.g., cocobetaine, cocoamidopropylbetaine), amine oxides, derivatives thereof, and combinations thereof. One of ordinary skill in the art will be able to determine which co-surfactants are best suited to the particular embodiments and applications of the compositions and methods described herein. For example, in some embodiments, the treatment fluids may be foamed by injection of a gas therein, wherein a co-surfactant (such as a cocobetaine) is included in treatment fluids to facilitate the formation of and/or stabilize the foam. In some embodiments, the co-surfactant may act to at least partially stabilize the treatment fluid. Generally, the co-surfactants may be present an amount sufficient to optimize the performance of the treatment fluid in a particular application, as determined by one of ordinary skill in the art. In one embodiment, for example, where the co-surfactant is included to increase salt tolerability or to stabilize the treatment fluids of the present invention, the co-surfactant is present in a co-surfactant to MES surfactant weight ratio in the range of from about 1:3 to about 3:1.

Optionally, the treatment fluids of the present invention further may comprise an acid. Among other things, the acid may interact with at least a portion of the subterranean formation so as to, in some instances, facilitate micelle formation. For example, as the acid reacts with the formation, the reaction by-products and/or spending of the acid may, inter alia, provide the conditions necessary for the viscosification of a particular treatment fluid of the present invention. The acid that may be present in the treatment fluids of the present invention may comprise organic acids, inorganic acids, derivatives thereof, or combinations thereof. An acid with an extremely low pH (e.g., concentrations of HCl greater than about 15%), however, may affect the ability of the treatment fluids of the present invention to form a gel. Examples of suitable acids include, but are not limited to, hydrochloric acid, hydrofluoric acid, formic acid, phosphoric acid, sulfamic acid, acetic acid, derivatives thereof, and mixtures thereof. In certain embodiments, the acid may be present in the treatment fluids in an amount of from about 0.5% to about 20% bwof. In certain embodiments, the acid may be present in the treatment fluids of the present invention in an amount of from about 5% to about 15% bwof. Individuals skilled in the art, with the benefit of this disclosure, will be able to select a suitable acid and a suitable concentration thereof.

The treatment fluids of the present invention may further comprise particulates (such as proppant particulates or gravel particulates) suitable for use in subterranean applications. Particulates suitable for use in the present invention may comprise any material suitable for use in subterranean operations. Suitable particulate materials include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, are often included in fracturing and sand control treatments. In certain embodiments, the particulates included in the treatment fluids of the present invention may be coated with any suitable resin or tackifying agent known to those of ordinary skill in the art.

The treatment fluids of the present invention may further comprise an additive for maintaining and/or adjusting pH (e.g., pH buffers, pH adjusting agents, etc.). For example, the additive for maintaining and/or adjusting pH may be included in the treatment fluid so as to maintain the pH in, or adjust the pH to, a desired range and thereby maintain, or provide, the necessary ionic strength to form the desired micellar structures. Examples of suitable additives for maintaining and/or adjusting pH include, but are not limited to, sodium acetate, acetic acid, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium hydroxide, potassium hydroxide, lithium hydroxide, combinations thereof, derivatives thereof, and the like. The additive for adjusting and/or maintaining pH may be present in the treatment fluids of the present invention in an amount sufficient to maintain and/or adjust the pH of the fluid. One of ordinary skill in the art, with the benefit of this disclosure, will recognize the appropriate additive for maintaining and/or adjusting pH and amount thereof to use for a chosen application.

The treatment fluids of the present invention may optionally comprise additional additives, including, but not limited to, fluid loss control additives, gas, corrosion inhibitors, scale inhibitors, catalysts, clay control agents, biocides, friction reducers, combinations thereof and the like. For example, in some embodiments, it may be desired to foam a treatment fluid of the present invention using a gas, such as air, nitrogen, or carbon dioxide. In another embodiment, it may be desired to include an acid in the treatment fluid. In one certain embodiment, the treatment fluids of the present invention may contain a particulate additive, such as a particulate scale inhibitor. Individuals skilled in the art, with the benefit of this disclosure, will recognize the types of additives that may be necessary for inclusion in the treatment fluids of the present invention for a particular application.

The treatment fluids of the present invention may be prepared by any suitable method. In some embodiments, the treatment fluids may be prepared on the job site. As an example of such an on-site method, a MES surfactant may be combined with an aqueous base fluid and one or more salts. As previously mentioned, the one or more salts may provide sufficient ionic strength to promote the desired micelle formation, such that the treatment fluid exhibits viscoelastic behavior. In some embodiments, the one or more salts may be combined with the aqueous base fluid prior to their combination with the MES surfactant. In one certain embodiment, an additive buffer may be combined with the aqueous base fluid, among other things, to adjust the pH and/or maintain the pH, in a desired range for the desired micelle formation such that the treatment fluid exhibits viscoelastic behavior. The additive for maintaining and/or adjusting pH may be combined with the aqueous base fluid either prior to, after, or simultaneously with the MES surfactant. Furthermore, additional additives, as discussed above, may be combined with the treatment fluid and/or the aqueous base fluid as desired. For example, a particulate additive (e.g., a particulate scale inhibitor) or particulates (e.g., gravel particulates or proppant particulates) may be suspended in the treatment fluid. In some embodiments, to facilitate mixing with the aqueous base fluid, the MES surfactant may be combined with a surfactant solubilizer prior to its combination with the other components of the treatment fluid. The surfactant solubilizer may be any suitable surfactant solubilizer, such as water, simple alcohols, and combinations thereof. For example, in some embodiments, the MES surfactant may be provided in a mixture that comprises the surfactant solubilizer and the MES surfactant. One or ordinary skill in the art, with the benefit of this disclosure, will be able to determine other suitable methods for preparation of the treatment fluids.

As previously discussed, at certain conditions, the MES surfactant molecules present in the treatment fluids of the present invention may associate to form the desired micelles, which, depending on a number of factors (e.g., MES surfactant concentration), may viscosify the fluid so that it exhibits viscoelastic behavior. The micelles present in the treatment fluids of the present invention are generally sensitive to, among other things, the ionic strength of the fluid, hydrocarbons, and shear stress. Further, they also may be sensitive to temperature. Accordingly, these treatment fluids containing the desired micelles may experience a viscosity decline after introduction into the well bore and/or penetration into the subterranean formation, without the need for external gel breakers. As previously discussed, this viscosity reduction is generally due to the dissociation and/or modification of the micellar structure. For example, in hydrocarbon-containing portions of the subterranean formation, the viscosity of the treatment fluids may be reduced by contact with the hydrocarbons contained therein. Likewise, in certain portions of the subterranean formation (e.g., carbonate formations), the treatment fluids may experience a pH change, thereby facilitating a change in the ionic strength of the fluid. In certain embodiments, dilution of the treatment fluid also may facilitate a reduction in viscosity of the treatment fluid. For example, the treatment fluid may be diluted by contact with formation fluids and/or subsequently injected treatment fluids, thereby reducing the concentration of the desired micelles in the treatment fluid and/or changing the ionic strength of the treatment fluid.

The methods of the present invention generally comprise using a treatment fluid of the present invention to divert at least a portion of a second fluid to a different portion of the subterranean formation. In certain embodiments, the methods of the present invention comprise: providing a treatment fluid of the present invention that comprises an aqueous base fluid and a MES surfactant; introducing the treatment fluid of the present invention into a portion of a subterranean formation; and allowing the treatment fluid of the present invention to divert at least a portion of a second fluid to a different portion of the subterranean formation. The second fluid may be of the same composition or a different composition than the treatment fluid of the present invention. For example, in some instances, the treatment fluid of the present invention may be self-diverting. In some embodiments, the second fluid may be introduced into the well bore subsequent to the treatment fluid of the present invention. In some embodiments, the treatment fluid of the present invention may be formulated so that its viscosity is initially very low (e.g., less than about 20 cP at 511 s$^{-1}$). For example, prior to introduction into the subterranean formation, it may be desired for the treatment fluid of the present invention to have a viscosity sufficient to provide fluid loss control and/or to reduce friction created by the flow of treatment fluids in the subterranean formation. One of ordinary skill in the art, with the benefit of this disclosure, will recognize the optimal viscosity for the treatment fluid in a specific application.

In certain embodiments, the treatment fluid of the present invention may plug off a high-permeability section of the subterranean formation, thereby diverting subsequently introduced fluids to less permeable sections of the formation. In other embodiments (e.g., uses in scale inhibition operations and clay stabilization operations), the treatment fluid of the present invention may divert the subsequently introduced fluids so as to obtain a uniform distribution of those fluids throughout the subterranean formation regardless of the permeability of the particular portion thereof. In certain embodiments, the treatment fluid of the present invention may divert the subsequently introduced fluids away from certain portions (e.g., water-producing portions) of a subterranean formation entirely to treat other portions (e.g., hydrocarbon-producing portions) of the subterranean formation. Those of ordinary skill in the art, with the benefit of this disclosure, should be able to determine other suitable diverting applications for the treatment fluids of the present invention.

In some embodiments, the present invention provides a method of treating a subterranean formation, the method comprising: providing a treatment fluid comprising an aqueous base fluid, a water-soluble salt, and a methyl ester sulfonate surfactant; introducing the treatment fluid into a portion of the subterranean formation; introducing a second fluid into the well bore; allowing the treatment fluid to form a gel sufficient to divert at least a portion of the second fluid to a different portion of the subterranean formation; and allowing the treatment fluid to divert at least a portion of the second fluid to a different portion of the subterranean formation.

In some embodiments, the present invention provides a method of diverting a fluid from a portion of a subterranean formation, the method comprising: providing a treatment fluid comprising an aqueous base fluid, a water-soluble salt, and a methyl ester sulfonate surfactant; introducing the treatment fluid into the portion of the subterranean formation; introducing a second fluid into a well bore that penetrates the subterranean formation; and allowing the treatment fluid to divert at least a portion of the second fluid to a different portion of the subterranean formation.

So that the treatment fluid of the present invention may divert the flow of the second fluid, the treatment fluid of the present invention should be formulated such that it is, or may form, a gel sufficient to divert flow. The viscosity of the gel necessary to divert flow may depend on, among other factors, the depth of the gel plug created, the size of the pores or wormholes, the strength of the acid (if used), the composition of the second fluid to be diverted, the temperature of the subterranean formation, and differential pressure. In some embodiments, the treatment fluid of the present invention may be a gel sufficient to divert flow prior to introduction into the subterranean formation. In some embodiments, the gel may form during or subsequent to the introduction of the treatment fluid into the portion of the subterranean formation. For example, the treatment fluid of the present invention may contact formation fluids (e.g., formation brines) that provide the conditions sufficient for micelle formation, thereby forming the necessary diverting gel. In other instances, the treatment fluid of the present invention further may comprise an acid. As the acid reacts with the subterranean formation, the presence of reaction by-products or the spending of the acid may, among other things, provide the conditions necessary for the viscosification of the treatment fluid, thereby facilitating micelle formation, which in turn forms the necessary diverting gel. Accordingly, the treatment fluids of the present invention may exhibit viscoelastic behavior, either prior to and/or subsequent to introduction into the subterranean formation, due, at least in part, to the association of at least a portion of the methyl ester sulfonate surfactant into a plurality of micellar structures.

As previously mentioned, the treatment fluid of the present invention may experience a reduction in viscosity after placement into the subterranean formation. For example, the treatment fluid of the present invention may be allowed to contact subterranean formation for a period of time sufficient to reduce the viscosity of the treatment fluid. In some embodiments, the treatment fluid of the present invention may be allowed to contact hydrocarbons, formations fluids, and/or subsequently injected fluids, thereby reducing the viscosity of the treatment fluid. After a chosen time, the treatment fluid of the present invention may be recovered through the well bore that penetrates the subterranean formation.

The methods and treatment fluids of the present invention may be used, inter alia, for the diversion of fluids in a variety of subterranean operations, such as acid stimulation operations, scale inhibition operations, scale removal operations, and clay stabilization operations. In certain embodiments, the methods and treatment fluids of the present invention may be utilized prior to conducting one or more of these operations. In other embodiments, the methods and treatment fluids of the present invention also may be utilized during the course of or as a part of those operations. For example, the treatment fluids of the present invention may comprise an acid that, inter alia, reacts during the course of acid stimulation operations.

To facilitate a better understanding of the present invention, the following examples of preferred embodiments are given. In no way should the following examples be read to limit, or define, the scope of the invention.

EXAMPLES

Example 1

To determine the viscosification of a treatment fluid using a MES surfactant, laboratory samples were prepared by mixing a MES surfactant (EFS™-4 surfactant) with an aqueous base fluid. Further, the aqueous base fluid used was tap water unless otherwise indicated. In certain samples, a salt was included in the aqueous base fluid. Where included, the concentration and type of salt included in the aqueous base fluid were varied. Once prepared, each sample was observed to determine gel formation. For purposes of this example, a sample was considered gelled if it had a viscosity of greater than about 20 centipoise at 511 sec⁻. The compositions of each sample and observations thereof are listed in Table 1.

TABLE 1

| Sample No. | MES Concentration[1] (by weight) | Aqueous Base Fluid | Result |
| --- | --- | --- | --- |
| 1 | 5% | Water | Not gelled |
| 2 | 5% | Seawater | Gelled |
| 3 | 5% | 5% KCl by wt | Gelled |
| 4 | 5% | 5% NaCl by wt | Gelled |
| 5 | 5% | 10% NaCl by wt | Gelled |
| 6 | 5% | 5% CaCl$_2$ by wt | Gelled |
| 7 | 5% | 10% CaCl$_2$ by wt | Gelled |
| 8 | 5% | 5% NaCl by wt 5% CaCl$_2$ by wt | Gelled |
| 9 | 5% | 10% NaCl by wt 10% CaCl$_2$ by wt | Gelled |
| 10 | 5% | 5% NH$_4$Cl by wt | Gelled |
| 11 | 5% | 10% NH$_4$Cl by wt | Gelled |

[1]Similar results were obtained for each sample when 10% by weight of the MES surfactant was used.

Additionally, further samples were prepared, wherein a sufficient amount of sodium hydroxide was included in the aqueous base fluid so that the pH of the sample was above 7, i.e., the sample was basified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 2.

TABLE 2

| Sample No. | MES Concentration[2] (by weight) | Aqueous Base Fluid (basified with NaOH to pH 10) | Result |
|---|---|---|---|
| 12 | 5% | 5% NaCl by wt | Gelled |
| 13 | 5% | 10% NaCl by wt 5% KCl by wt | Gelled |
| 14 | 5% | 5% CaCl$_2$ by wt | Gelled |
| 15 | 5% | 10% CaCl$_2$ by wt | Gelled |
| 16 | 5% | 5% NaCl by wt 5% CaCl$_2$ by wt | Gelled |
| 17 | 5% | 10% NaCl by wt 10% CaCl$_2$ by wt | Gelled |
| 18 | 5% | seawater | Gelled |
| 19 | 5% | 5% NH$_4$Cl by wt | Gelled |

[2]Similar results were obtained for each sample when 10% by weight of the MES surfactant was used.

Additionally, further samples were prepared, wherein a sufficient amount of hydrochloric acid was included in the aqueous base fluid so that the pH of the sample was below 7, i.e., the sample was acidified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 3.

TABLE 3

| Sample No. | MES Concentration[3] (by weight) | Aqueous Base Fluid (acidified with HCl to pH 4) | Result |
|---|---|---|---|
| 20 | 5% | 5% NaCl by wt | Gelled |
| 21 | 5% | 10% NaCl by wt 5% KCl by wt | Gelled |
| 22 | 5% | 5% CaCl$_2$ by wt | Gelled |
| 23 | 5% | 10% CaCl$_2$ by wt | Gelled |
| 24 | 5% | 5% NaCl by wt 5% CaCl$_2$ by wt | Gelled |
| 25 | 5% | 10% NaCl by wt 10% CaCl$_2$ by wt | Gelled |
| 26 | 5% | seawater | Gelled |
| 27 | 5% | 5% NH$_4$Cl by wt | Gelled |

[3]Similar results were obtained for each sample when 10% by weight of the MES surfactant was used.

Additionally, further samples were prepared wherein the aqueous base fluid contained 15% hydrochloric acid by weight of the aqueous base fluid. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 4.

TABLE 4

| Sample No. | MES Concentration[4] (by weight) | Aqueous Base Fluid | Result |
|---|---|---|---|
| 28 | 5% | 15% HCl | Not gelled |
| 29 | 5% | 15% HCl 5% NaCl by wt | Not gelled |
| 30 | 5% | 15% HCl 5% KCl by wt | Not gelled |
| 31 | 5% | 15% HCl 5% CaCl$_2$ by wt | Not gelled |
| 32 | 5% | 15% HCl 5% NH$_4$Cl by wt | Not gelled |

[4]Similar results were obtained for each sample when 10% by weight of the MES surfactant was used.

Additionally, further samples were prepared wherein the aqueous base fluid contained 10% hydrochloric acid by weight of the aqueous base fluid. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 5.

TABLE 5

| Sample No. | MES Concentration (by weight) | Aqueous Base Fluid | Result |
|---|---|---|---|
| 33 | 5% | 10% HCl | Gelled |
| 34 | 5% | 10% HCl 5% NaCl by wt | Gelled |
| 35 | 5% | 10% HCl 5% KCl by wt | Gelled |
| 36 | 5% | 10% HCl 5% CaCl$_2$ by wt | Gelled |
| 37 | 5% | 10% HCl 5% NH$_4$Cl by wt | Gelled |

Additionally, further samples were prepared, wherein a sufficient amount of sodium hydroxide was included in the aqueous base fluid so that the pH of the sample was above 7, i.e., the sample was basified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 6.

TABLE 6

| Sample No. | MES Concentration (by weight) | Aqueous Base Fluid (basified with NaOH to pH 10) | Result |
|---|---|---|---|
| 38 | 5% | 5% CaCl$_2$ by wt | Gelled |
| 39 | 5% | 5% MgCl$_2$ by wt | Gelled |
| 40 | 5% | 5% CaCl$_2$ by wt 5% MgCl$_2$ by wt | Gelled |

Additionally, further samples were prepared, wherein a sufficient amount of hydrochloric acid was included in the aqueous base fluid so that the pH of the sample was below 7, i.e., the sample was acidified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 7.

TABLE 7

| Sample No. | MES Concentration (by weight) | Aqueous Base Fluid (acidified with HCl to pH 4) | Result |
|---|---|---|---|
| 41 | 5% | 5% CaCl$_2$ by wt | Gelled |
| 42 | 5% | 5% MgCl$_2$ by wt | Gelled |
| 43 | 5% | 5% CaCl$_2$ by wt 5% MgCl$_2$ by wt | Gelled |

Thus, Example 1 indicates that a MES surfactant may be used to viscosify a fluid.

Example 2

Rheological tests were performed on laboratory samples that were prepared as follows. Samples were prepared by mixing water with the following components: an MES surfactant in an amount of about 1.5% by weight of the sample; a cocobetaine in an amount of about 1.5% by weight of the sample; and various concentrations of sodium chloride (3.5%, 4.0%, 4.5%, 6.0%, and 7.0%). The MES surfactant included in the samples was an alpha-sulfo fatty acid methyl ester that is commercially available as ALPHA-STEP XMP-66® from Stepan Company, Northfield, Ill. Further, the cocobetaine used in the samples is commercially available as Witco Rewoteric AM B-13®.

Once prepared, the samples were each placed in the R1 rotor cup of a Fann Model 50 viscometer to determine the viscosities of the sample, utilizing a nonscanning shear rate procedure. The rotor cups containing the samples were set in motion at a constant rate of about 95 rpm providing a shear rate of about 82 sec$^{-1}$ on the sample. The sample was brought up to about 230° F. as the viscosities of the samples were measured. A plot of temperature (° F.) versus viscosity (cP) for each sample is provided in FIG. 1. Table 8 identifies the maximum viscosities and corresponding temperatures for each sample.

TABLE 8

| NaCl Concentration (by weight) | Max Viscosity (cP) | Temperature (° F.) |
|---|---|---|
| 3.5% | 73 | 133 |
| 4.0% | 88 | 132 |
| 4.5% | 97 | 132 |
| 6.0% | 98 | 142 |
| 7.0% | 92 | 141 |

Thus, Example 2 illustrates that a MES surfactant may be used to viscosify a fluid.

Example 3

Rheological tests were performed on laboratory samples that were prepared as follows. Two samples were prepared by mixing water with the following components: an MES surfactant in an amount of about 5% by weight of the sample with about 5% sodium chloride. Sample A was used without adjusting the pH. The pH of Sample B was adjusted with NaOH to about 10. The MES surfactant included in the samples was an alpha-sulfo fatty acid methyl ester that is commercially available as EFS™-4 Surfactant from Halliburton Energy Services, Inc., Duncan, Okla.

Figure 2:
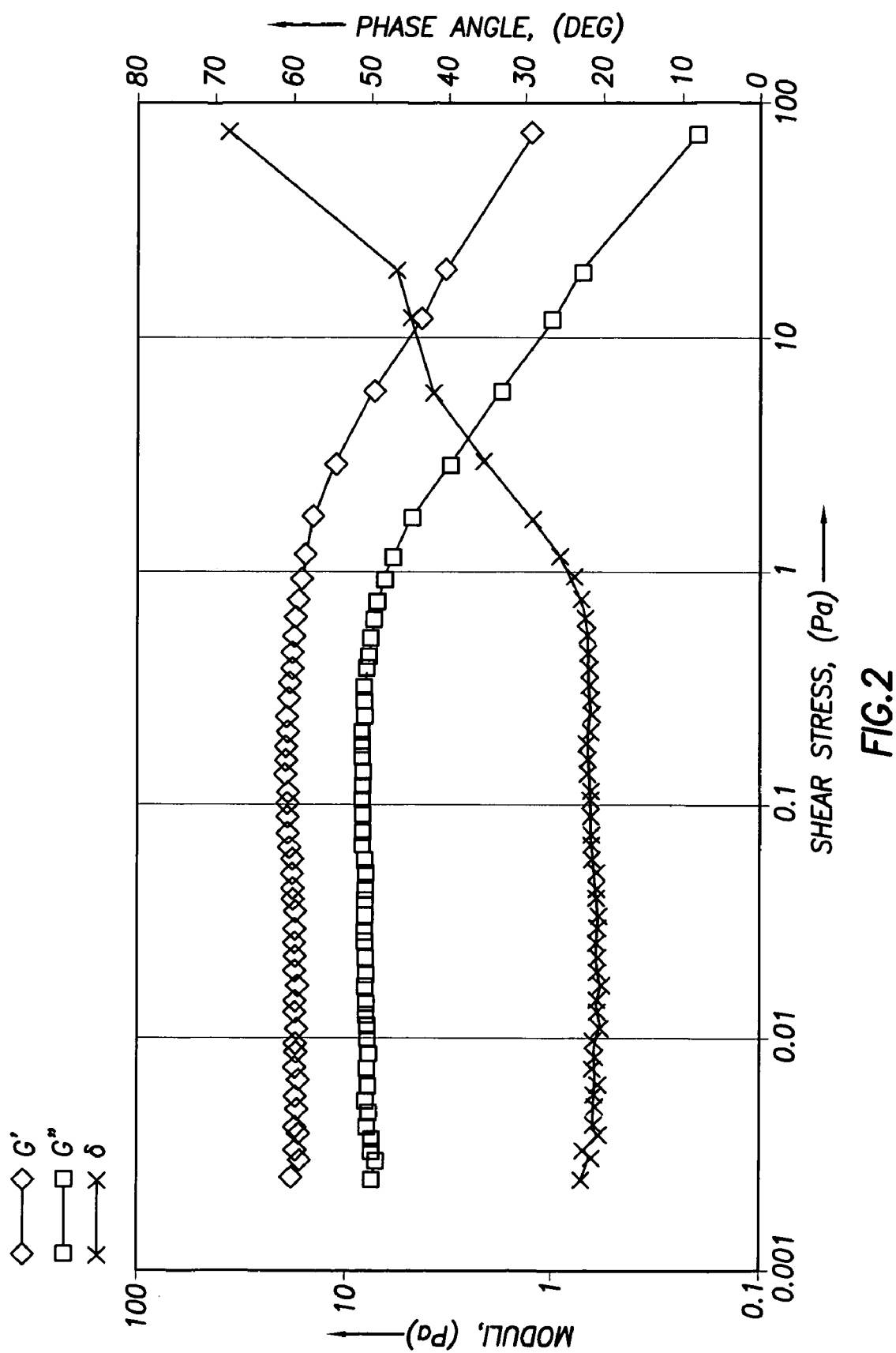
FIG. 2 is a plot of shear stress versus storage modulus, loss modulus, and phase angle as measured using a Haake Rheostress RS150 stress-controlled rheometer for a sample fluid that comprises a MES surfactant and sodium chloride.
Figure 3:
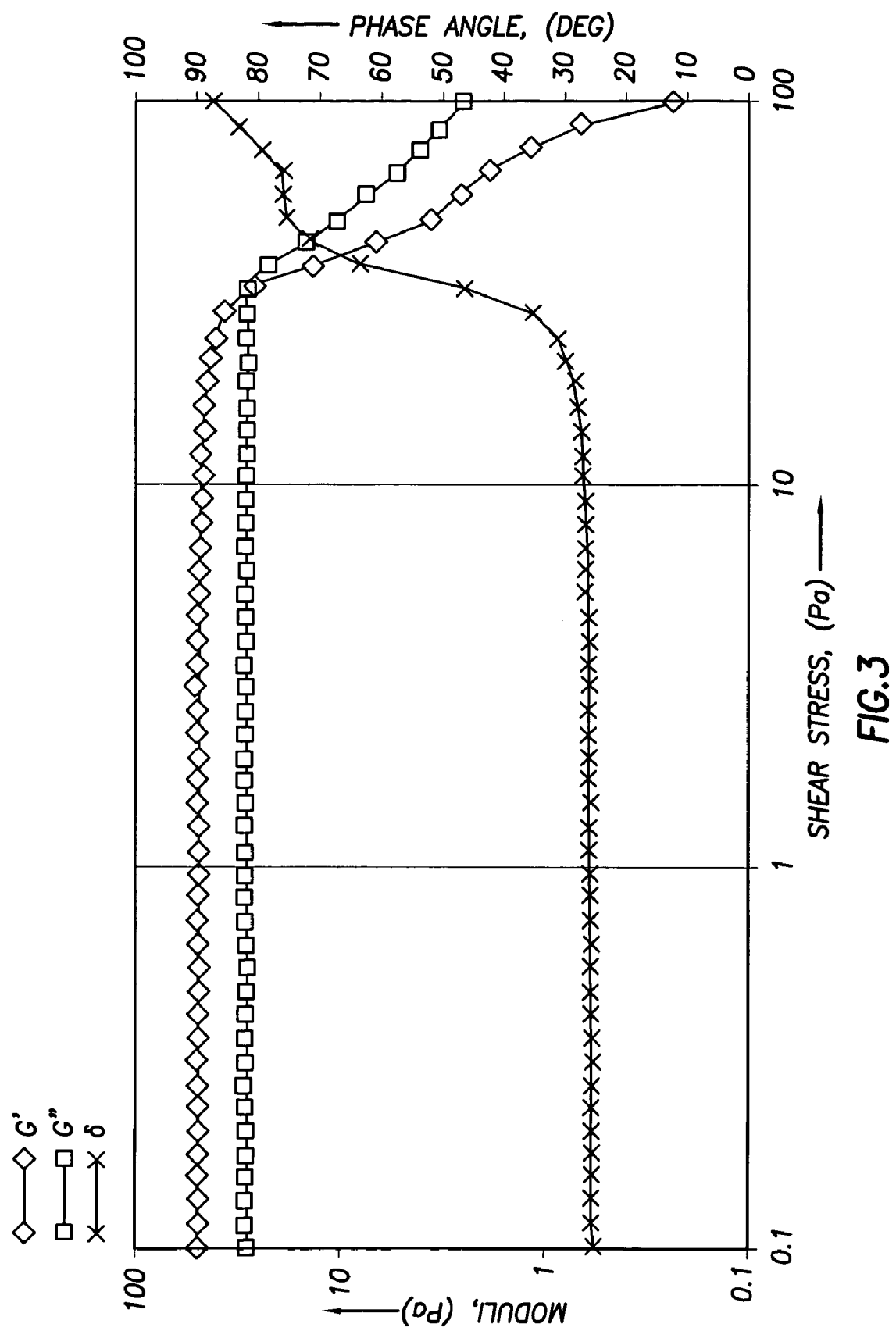
FIG. 3 is a plot of shear stress versus storage modulus, loss modulus, and phase angle as measured using a Haake Rheostress RS150 stress-controlled rheometer for another sample fluid that comprises a MES surfactant and sodium chloride.

Once the samples were prepared, the rheology was determined using a Haake RheoStress RS150 stress-controlled rheometer fitted with a 60 mm diameter, 2° cone and plate. The temperature was held constant at 25° C. A constant frequency (1 Hz) oscillatory stress sweep was performed over the stress range indicated to obtain the storage modulus (G'), loss modulus (G"), and phase angle (δ). Results are shown in FIGS. 2 and 3 for Samples A and B, respectively.

Thus, Example 3 illustrates that a MES surfactant may be used to viscosify a fluid.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims. The terms in the claims have their plain, ordinary meaning unless otherwise defined by the patentee.

The invention claimed is:

1. A method of treating a subterranean formation comprising:
   providing a treatment fluid comprising:
   an aqueous base fluid; and
   a methyl ester sulfonate surfactant having the following formula:

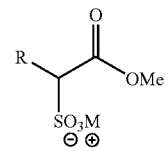

where R is an alkyl chain of about 10 carbon atoms to about 30 carbon atoms;
   introducing the treatment fluid into a portion of a subterranean formation; and
   allowing the treatment fluid to divert at least a portion of a second fluid to a different portion of the subterranean formation.

2. The method of claim 1 wherein the treatment fluid exhibits viscoelastic behavior due, at least in part, to the association of at least a portion of the methyl ester sulfonate surfactant into a plurality of micellar structures.

3. The method of claim 2 wherein the treatment fluid exhibits the viscoelastic behavior prior to and/or subsequent to the introduction of the treatment fluid into the portion.

4. The method of claim 1 wherein the treatment fluid further comprises a water-soluble salt.

5. The method of claim 4 wherein the water-soluble salt comprises at least one water-soluble salt selected from the group consisting of:
   ammonium chloride; lithium bromide; lithium chloride; lithium formate; lithium nitrate; calcium bromide; calcium chloride; calcium nitrate; calcium formate; sodium bromide; sodium chloride; sodium formate; sodium nitrate; potassium chloride; potassium bromide; potassium nitrate; potassium formate; cesium nitrate; cesium formate; cesium chloride; cesium bromide; magnesium chloride; magnesium bromide; zinc chloride; zinc bromide; any combination thereof; and any derivative thereof.

6. The method of claim 1 wherein the methyl ester sulfonate surfactant is present in the treatment fluid in an amount of from about 0.5% to about 15% by weight of the treatment fluid.

7. The method of claim 1 wherein R is an alkyl chain of from about 16 to about 22 carbon atoms.

8. The method of claim 1 wherein the treatment fluid further comprises at least one component selected from the group consisting of: a co-surfactant; an acid; particulates; an additive for adjusting and/or maintaining pH; a fluid loss control additive; a gas; a corrosion inhibitor; a scale inhibitor; a catalyst; a clay control agent; a biocide; a friction reducer; and any combination thereof.

9. The method of claim 8 wherein the co-surfactant comprises at least one component selected from the group consisting of: a betaine; an amine oxide; any derivative thereof; and any combination thereof.

10. The method of claim 1 wherein the step of allowing the treatment fluid to divert at least a portion of a second fluid to a different portion of the subterranean formation comprises allowing the treatment fluid to form a gel sufficient to divert the flow of the fluid subsequently introduced into the well bore.

11. The method of claim 10 wherein the treatment fluid further comprises an acid that interacts with the subterranean formation so as to facilitate micelle formation, thereby forming the gel.

12. The method of claim 10 wherein the treatment fluid contacts a formation fluid so as to provide conditions sufficient for micelle formation, thereby forming the gel.

13. The method of claim 1 further comprising allowing the treatment fluid to contact the subterranean formation for a period of time sufficient to reduce the viscosity of the treatment fluid.

14. The method of claim 1 further comprising allowing the treatment fluid to contact hydrocarbons contained in the subterranean formation, a formation fluid, and/or a treatment fluid, thereby reducing the viscosity of the treatment fluid.

15. The method of claim 1 further comprising recovering the treatment fluid through a well bore that penetrates the subterranean formation.

16. A method of treating a subterranean formation comprising:
providing a treatment fluid comprising:
an aqueous base fluid;
a water-soluble salt; and
a methyl ester sulfonate surfactant having the following formula:

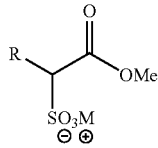

where R is an alkyl chain of about 10 carbon atoms to about 30 carbon atoms;
introducing the treatment fluid into a portion of the subterranean formation;
introducing a second fluid into a well bore that penetrates the subterranean formation;
allowing the treatment fluid to form a gel sufficient to divert at least a portion of the second fluid from the portion of the subterranean formation; and
allowing the treatment fluid to divert at least a portion of the second fluid to a different portion of the subterranean formation.

17. The method of claim 16 wherein the treatment fluid further comprises at least one component selected from the group consisting of: a co-surfactant; an acid; particulates; an additive for adjusting and/or maintaining pH; a fluid loss control additive; a gas; a corrosion inhibitor; a scale inhibitor; a catalyst; a clay control agent; a biocide; a friction reducer; and any combination thereof.

18. A method of diverting a fluid from a portion of a subterranean formation comprising:
providing a treatment fluid comprising:
an aqueous base fluid;
a water-soluble salt; and
a methyl ester sulfonate surfactant having the following formula:

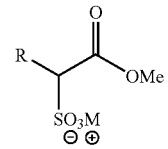

where R is an alkyl chain of about 10 carbon atoms to about 30 carbon atoms;
introducing the treatment fluid into the portion of the subterranean formation;
introducing a second fluid into a well bore that penetrates the subterranean formation; and
allowing the treatment fluid to divert at least a portion of the second fluid to a different portion of the subterranean formation.

19. The method of claim 18 wherein the treatment fluid exhibits viscoelastic behavior due, at least in part, to the association of at least a portion of the MES surfactant into a plurality of micellar structures.

20. The method of claim 18 wherein the treatment fluid further comprises at least one component selected from the group consisting of: a co-surfactant; an acid; particulates; an additive for adjusting and/or maintaining pH; a fluid loss control additive; a gas; a corrosion inhibitor; a scale inhibitor; a catalyst; a clay control agent; a biocide; a friction reducer; and any combination thereof.

* * * * *